United States Patent [19]
Breer et al.

[11] 3,871,556

[45] Mar. 18, 1975

[54] MACHINE FOR FILLING MOULDS OR CAVITIES WITH A FREE-FLOWING MIXTURE OF REACTION COMPONENTS

[75] Inventors: Karl Breer, both of Bergisch-Neukirchen; Klaus Nadolski, both of Bergisch-Nuekirchen, Germany

[73] Assignee: Bayer Aktiengesellschaft, Leverkusen, Germany

[22] Filed: Feb. 12, 1973

[21] Appl. No.: 331,460

[30] Foreign Application Priority Data
Feb. 26, 1972   Germany............................ 2209169

[52] U.S. Cl............. 222/132, 222/144.5, 222/330, 222/318, 222/134
[51] Int. Cl............................................ B67d 5/60
[58] Field of Search ........ 222/132, 134, 144.5, 330, 222/331, 318; 137/552.5

[56] References Cited
UNITED STATES PATENTS

| | | | |
|---|---|---|---|
| 2,904,070 | 9/1959 | Lynott .......................... | 137/552.5 |
| 3,224,642 | 12/1965 | DeMartelaere et al. ............ | 222/134 |
| 3,386,623 | 6/1968 | Berrill et al....................... | 222/134 |

*Primary Examiner*—Allen N. Knowles
*Assistant Examiner*—Joseph J. Rolla
*Attorney, Agent, or Firm*—Burgess, Dinklage & Sprung

[57] ABSTRACT

A machine with at least two alternately feedable mixing heads is used for filling moulds or cavities with foam, each pipeline being provided with pipeline switches which are coupled with one another corresponding to the number of components and which are made up of identical housings with slides arranged in a row alongside one another.

36 Claims, 8 Drawing Figures

MACHINE FOR FILLING MOULDS OR CAVITIES WITH A FREE-FLOWING MIXTURE OF REACTION COMPONENTS

This invention relates to a machine for filling moulds or cavities with a free-flowing mixture of at least two reaction components which when mixed together form a plastics material, more particularly a foam, the machine consisting of storage vessels for the components which are each provided with a pipeline leading therefrom via a metering pump and which branch to at least two mixing heads which are prevented from being filled at the same time by a pipeline switch provided in each pipeline, at least those pipeline switches associated with one mixing head being coupled with one another in terms of motion.

Machines of this kind are used where it is possible to carry out foaming at different places with different mixing heads successively with a mixture of the same chemical composition. One requirement which has to be satisfied in this respect is that the working time: rest time ratio of each individual mixing head should be so unfavourable that there is no need to provide separate pumps, etc., for each mixing head and the working times of the individual mixing heads can be adapted to one another. Machines of this kind are used for example in production lines in the motor-vehicle industry or for filling moulds carried on conveyor belts. Each component is supplied to a respective central pipeline from which branch lines which can be shut off by taps lead to the individual mixing heads. It has been found with taps of this kind that, even after a short period of service, the low viscosity liquids delivered penetrate between the plugs and the housing and cause leaks. However, leaks of this kind are particularly undesirable in cases where it is desired to produce mouldings the surfaces of which are to be visible or high-strength mouldings, because leakage losses cause pressure fluctuations in the feed systems so that, under certain circumstances, one of the components can be ahead of the others on entry into the mixing head. The disadvantage of this is that the leading component cannot be mixed with the other component and hence enters the mould unmixed, ultimately producing a fault in the finished moulding.

The object of the present invention is to provide a machine of the kind referred to above which is inexpensive to construct and in which the pipe switches do not present any sealing problems. In addition, the machine according to the invention is intended to be able to be equipped with any number of mixing heads. In addition, the machine according to the invention is intended to lend itself to further extension by having further mixing heads added to it without any need for further expense. In addition, the machine according to the invention is intended to operate so safely that none of the aforementioned faults occur in the completed mouldings.

According to the invention, these objects are achieved by virtue of the fact that the pipe switches are made up of an arbitrary number of identical sealed housings with slides that are arranged in a row alongside one another, the first housing comprising at its inlet end an inlet connected to the pipeline leading off from the associated component storage vessel, whilst three outlets are provided at the output end, a first outlet having a pipeline leading to a first mixing head connected to it, a second outlet having a pipeline leading to a second mixing head, a third outlet corresponding to the inlet of the following housing, each slide having connecting ducts for inlet and outlets and being adapted to allow the following switching positions to be established:

a. in the operative position for the first mixing head: connecting the inlet with the first outlet through a connecting duct of the slide and interrupting the connection between inlet and second and third outlet through the slide;

b. in the operative position for the second mixing head: connecting the inlet with the second outlet through a connecting duct of the slide and interrupting the connection between inlet and first and third outlets through the slide;

c. in the rest position for both mixing heads: connecting the inlet with the third outlet through a connecting duct of the slide and interrupting the connections between inlet and first and second outlets through the slide;

and by virtue of the fact that the third outlet of the last housing is provided with a closure.

This provides for an extremely compact design of the pipe switches which in turn makes other advantages embodiments possible. The individual housings and slides are designed on the building-block principle, i.e., they are identical in structure, so that they can be arranged in a row alongside one another and can readily be replaced. Apart from the possibility of designing the slides in the form of vertical-lift slides or rotary slides, the arrangement of the inlets and outlets in the housing and of the ducts in the slide allows a number of variations which, although individually not inventive, can be substantially adapted to various manufacturing needs.

If for example the machine is intended to have an uneven number of mixing heads, one outlet for one mixing head in the last housing is sealed off by a closure or, preferably, one housing less is used and a pipeline with a third mixing head is associated instead of the closure with the third outlet of the (now) last housing. In the case of the first embodiment, there is still one connection for another mixing head in reserve, whilst the second embodiment saves one housing with its slide.

In one particular embodiment of the machine according to the invention, the housing comprises relief bores which communicate through relief ducts in the slides with the pipelines which lead to the non-functioning mixing heads and which are shut off on the one hand by the slides and on the other hand by inlets, whilst the relief duct associated with the functioning mixing head is completely closed in the housing.

In this way, the inlets in the mixing head, consisting either of valves or of injection nozzles, are relieved of the working pressure during the intervals in operation either towards the outside, for example to atmospheric pressure, to a desired initial pressure, depending upon the type of closure used for the relief bore, or, where the relief bores are connected by means of a line to the component storage vessel, to its initial pressure. Depending upon the particular embodiment, the working pressure can amount to between a few atmospheres and several hundred atmospheres. Accordingly, the relief of the inlets from this working pressure to a lower pressure guarantees a longer service life and also avoids leakage losses which would otherwise occur at the working pressure.

According to another particular embodiment of the machine, the housings comprise return bores, the third outlet of the last housing being connected through a return line with its inlet of the return bore and a return line leading to the component storage vessel being connected to the outlet of the return bore of the first housing, whilst in the remaining housings the outlet of the return bore of the preceding housing corresponds with the inlet of the return bore of the following housing, as seen in the return direction. In this way, the components can continue to be delivered by pumps which continue to operate when all the mixing heads are at rest. Startup fluctuations in the pipe systems are advantageously avoided if the pumps continue to operate.

In another particular embodiment, a throttle valve is arranged in the return line between the third outlet of the last housing and its inlet of the return bore. This throttle valve is preferably adjusted to the working pressure so that, in the circuit position, the operating pressure is maintained in the inlets of the housing, avoiding oscillating fluctuations in the pressure at the beginning of operation.

According to another preferred embodiment of the invention, the return bores also form the relief bores whilst the return ducts also form the relief ducts.

In one embodiment that is particularly favourable both in terms of design and in terms of operation technology, the inlet of each housing opens into annular grooves surrounding the slides whilst the outlets of each housing open out of the annular grooves surrounding the slides.

Similarly the connecting ducts and/or relief ducts consist of annular grooves arranged in the slide. The particular advantage of the annular grooves is that they are extremely easy to produce in terms of production technology and that no bending moments are applied to the slide itself by virtue of the fact that the liquid under pressure concentrically surrounds the slide. In this way, the danger of leaks developing in the slides is very considerably reduced.

Annular collecting grooves for leakage liquid are preferably provided surrounding the slide towards the end of the housing, preferably communicating with the relief bores. In this way, leakage liquid is prevented from escaping from the housings.

In order to avoid leakage, the connecting ducts of the slide which are exposed to the working pressures are also preferably situated towards the middle of the slide so that a pressure gradient is present towards the ends of the housing.

In order to be able further to simplify the housings at their inlet ends, it is possible in accordance with another particularly advantageous aspect of the invention for the first housing to be preceded via a seal by a connecting plate into which the pipeline leading away from the component storage vessel opens into a throughflow duct which corresponds with the inlet of the first housing. In this way, there is no need for the opening of the inlet in the housing to be provided with a screwthread into which the delivery pipe has to be screwed for example by means of a sealing retaining nut. Accordingly, the inlet for all housings can thus be in the form of a sample bore.

A return duct is preferably provided in the connecting plate which on the one hand corresponds with the return bore of the first housing and from which on the other hand the return line leads away to the component storage vessel. This arrangement has the same advantage in that no thread for a pipe connection need be provided in the return bore outlet of the housings.

A safety valve is arranged with particular advantage in the connecting plate between the throughflow duct and the return duct. Although safety valves of this kind have been used in conventional machines, their unique arrangement in the connecting plate affords particular advantages in that there is no need for a special safety valve accommodated in its own housing. In addition, the safety valve is particularly well protected against damage in the connecting plate.

In another particular embodiment of the machine according to the invention, the closure for the third outlet of the last housing consists of an end plate. Like the connecting plate, this has the advantage that the third outlet does not have to be provided with a screwthread for screwing in a closure screw. The end plate preferably comprises a return duct for connecting the third outlet to the outlet of the return bore of the last housing. This return duct can be machined particularly easily into the end plate, for example in the form of a groove.

According to another particularly advantageous aspect of the invention, the slides coupled with one another in terms of flow technology are connected to a control system. This control system can consist for example of contactors arranged on a belt on which the moulds to be filled or components with the cavities to be filled are carried.

The control system is preferably equipped with operating switches on each mixing head, a blocking device being provided for preventing the simultaneous operation of several mixing heads. The advantage of this arrangement is that the associated mixing head can be brought into operation by the operator of each mixing head. The blocking device prevents several mixing heads from being simultaneously actuated. It is not possible for several mixing heads to be filled at the same time because in this case precision-metering of the components would no longer be guaranteed on account of the fluctuations in pressure occurring.

In one alternative embodiment, the control system is linked to a programme transmitter. An arrangement of this kind would appear to be particularly suitable in the case of a fully automatic installation, for example for filling moulds.

Two embodiments of the machine according to the invention are diagrammatically illustrated in different working positions in the accompanying drawings, wherein.

Figure 1:
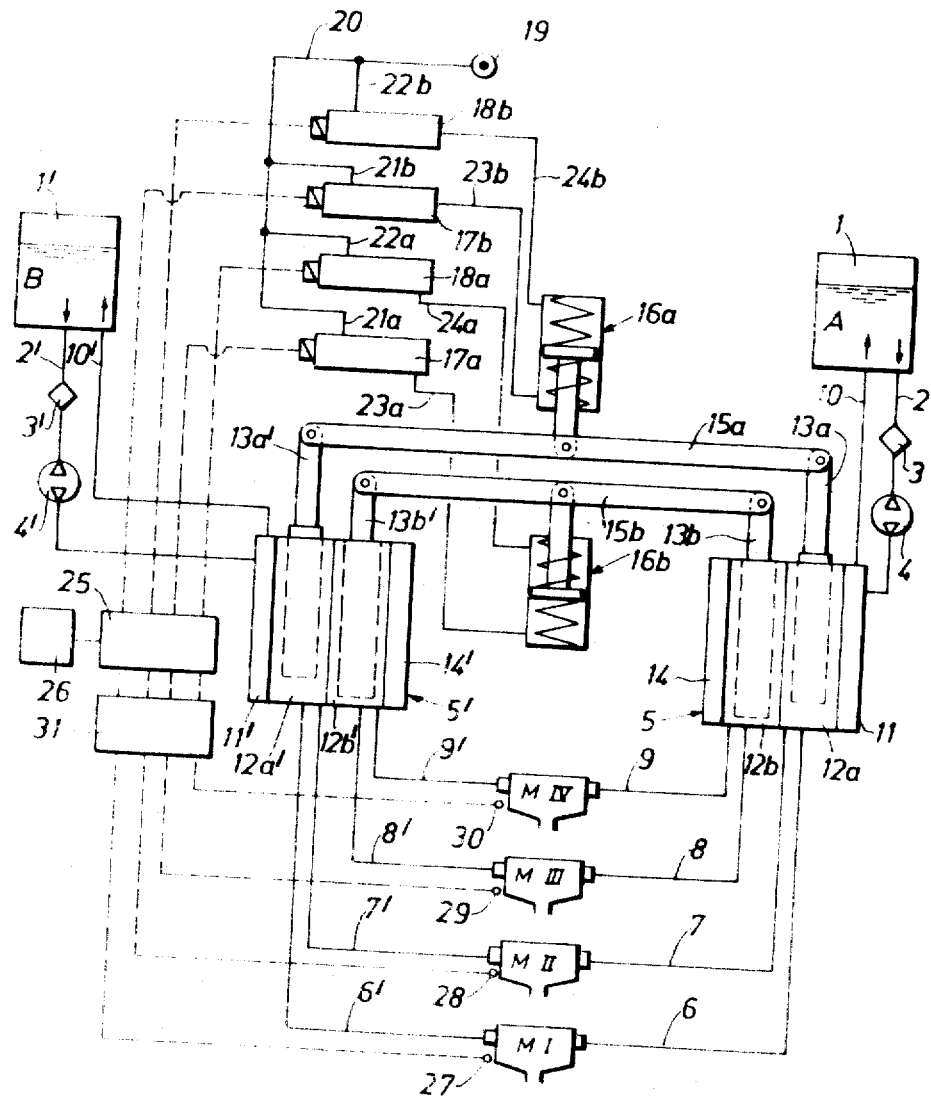
FIG. 1 is a block diagram of one embodiment of the machine.

With reference to FIG. 1, the components A (isocyanate) and B (polyol) are separately stored in component storage vessels 1 and 1'. Pipelines 2 and 2' lead away from them and contain filters 3 and 3', metering pumps 4 and 4' and pipe switches 5 and 5'. The pipelines 2 and 2' form the supply lines to the pipe switches 5 and 5', and the outlets therefrom consist of pipelines 6 and 6' leading to a first mixing head M I, pipelines 7 and 7' leading to a second mixing head M II, pipelines 8 and 8' leading to a third mixing head M III, and pipelines 9 and 9' leading to a fourth mixing head M IV. Return lines 10 and 10' are provided for cycling the components when none of the mixing heads is in operation.

The pipe switches 5 and 5' consist of connecting plates 11 and 11', housings 12a, 12b and 12a', 12b', slides 13a, 13b and 13a', 13b' arranged therein, and closure plates 14 and 14'. The slides 13a and 13a' and 13b and 13b' are connected together through yokes 15a and 15b, respectively. Each yoke 15a and 15b is coupled with a pneumatically operated adjusting cylinder 16a, 16b with which magnetic valves 17a, 18a and 17b, 18b are associated and connected through pipelines 23a, 24a, 23b and 24b. The adjusting cylinders 16a and 16b are designed to be operated from a compressed air source 19 through branch lines 21a, 22a, 21b, 22b leading off from a main line 20. They are connected to a control system 25 which is coupled to a programme transmitter 26 for automatic operation. Preferred adjusting cylinders 16a, 16b are the three-position cylinders described as type 192790 by the Westinghouse Brake Co., Ky., USA, in their prospectus No. A3–55.01. In addition, an operating switch 27, 28, 29 and 30 is associated with each mixing head M for manual operation. These switches are connected to a blocking device 31 which prevents switch-on signals for further mixing heads from reaching the control system 25 as long as one mixing head is already in operation. This ensures that only one mixing head is in operation at any one time.

Figure 2:
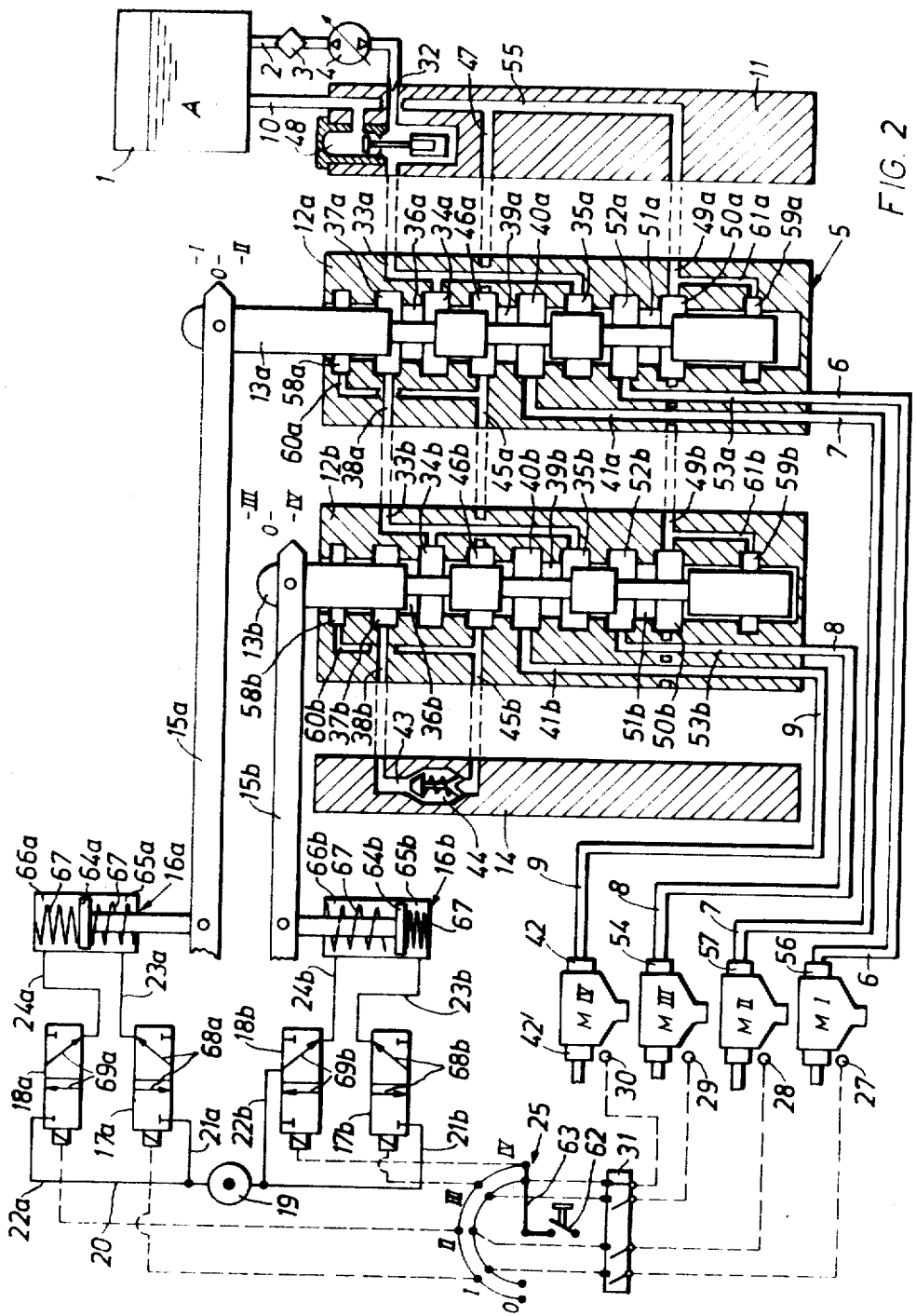
FIG. 2 is a section through the machine of FIG. 1 in its working position for a fourth mixing head with housings and slides.

Following this general illustration, the other Figures, especially FIG. 2, show more details of the structure and mode of operation of the housings and slides, but only for component A. The structure of the machine for the delivery of component B to the mixing heads is the same as it is for the delivery of component A. In the interests of clarity, the connecting plate, housing and endplate are shown detached from one another. In practice, these elements are in leak proof contact with one another.

The component A flows from the component storage vessel 1 through the pipeline 2, in which the filter 3 and the metering pump 4 are installed, into a throughflow duct 32 in the connecting plate 11 of the pipe switch 5. This throughflow duct 32 corresponds to (communicates with) an inlet 33a of the first housing 12a. The inlet 33a branches to two annular grooves 34a and 35a arranged in the housing 12a. The slide 13a, which is coupled through a yoke 15a, with the corresponding slide 13a' (FIG. 1), is in the rest position for the mixing heads M I and M II associated with the housing 12a. The body of the slide 13a closes the annular groove 35a, whilst the annular groove 34a is connected through an annular groove 36a in the slide 13a to an annular groove 37a in the housing 12a, away from which leads a third outlet 38a opening into the inlet 33b of the second and last housing 12b. Like the inlet 33a of the housing 12a, the inlet 33b branches to two annular grooves 34b and 35b. The slide 13b, which is coupled through a yoke 15b with the slide 13b' (FIG. 1) for component A, is in the working position for the mixing head M IV. Although the annular groove 34b now coincides with annular groove 36b arranged in the slide 13b, the adjacent sections of the slide 13b completely shut off the flow of component A here. By contrast, component A flows from the annular groove 35b into an annular groove 39b of the slide 13b. The annular groove 39b also communicates with an annular groove 40b in the housing 12b from which component A discharges through a second outlet 41b into a pipeline 9 leading to the mixing head M IV. In the mixing head M IV there is a mixing chamber (not shown) into which component A enters through an inlet 42 in the form of a springloaded injection nozzle. In the mixing chamber, component A is mixed with component B flowing in through the inlet 42' and then flows out of the mixing chamber.

An annular groove 37b is also provided in the housing 12b with a third outlet 38b leading away from it. It opens into a return duct 43 arranged in the end plate 14. In the return duct 43 there is a throttle valve 44 which is adjusted to the working pressure of the machine and which opens at this pressure. The return duct 43 opens into the return bore 45b which is provided in the housing 12b and with which an annular groove 46b surrounding the slide 13b is associated. The outlet of the return bore 45b corresponds (communicates with) to the inlet of the return bore 45a of the housing 12a. The return bore 45a comprises an annular groove 46a surrounding the slide 13a and, finally, its outlet opens into a return duct 47 in the connecting plate 11 and merges with a relief duct 55. In the connecting plate 11 there is a safety valve 48 which at one end is connected to the throughflow duct 32 and, at its other end, to the relief duct 55. In the event of over-loading, for example in the event of blockage of a duct, this safety valve 48 opens under the influence of the pressure building up. A pipeline 10 leads back from the relief duct 55 to the component storage vessel 1. As long as one mixing head M is functioning, i.e., as long as not all the slides 13a and 13b are in the circuit position, this return system is not used for return, but only for releasing the pressure in connected pipe sections to the initial pressure of around 3 atms. in the component storage vessel 1. Since not every pipe section can be covered by this system used alternately for return or for pressure release, another relief bore 49a, 49b is arranged in the housings 12a and 12a. Corresponding to the inlet of the return bore 45b of the housing 12b, an inlet of the relief bore 49b is also provided in the housing 12b. It is merely present on account of the identical structure of all the housings 12a and 12b through mass production, but does not perform any function and is sealed by the end plate 14. In practice, the relief bore 49b could actually terminate in the annular groove 50b provided in the housing 12b. In the illustrated position of the slide 13b for operation of the mixing head M IV, the annular groove 50b coincides with an annular groove 51b provided in the slide 13b which in turn communicates with another annular groove 52b in the housing 12b. The first outlet 53b of the housing 12b leads from the annular groove 52b through a pipeline 8 to the mixing head M III whose inlet 54 is closed. The outlet of the relief bore 49b corresponds to the inlet of the relief bore 49a of the housing 12a. The relief bore 49a comprises an annular groove 50a in the housing 12a and, finally, its outlet opens into the relief bore 55 which is provided in the connecting plate 11 and into which the return duct 47 opens inside the connecting plate 11. The annular groove 50a coincides with an annular groove 51a in the slide 13a which in turn coincides with an annular groove 52a of the housing 12 a. The first outlet 53a leads away from the annular groove 52a, being adjoined by a pipeline 6 which terminates in a closure 56 arranged on the mixing head M II.

The annular groove 46a coincides with an annular groove 39a in the slide 13a and, in addition, is connected to an annular groove 40a in this throughflow position of the slide 13a. A second outlet 41a leads away from the annular groove 40a and opens into a pipeline 7 which terminates in the inlet 57 of the mixing head M II.

In this way, the initial pressure under which component A is stored in the vessel 1 prevails from the closures 54, 56 and 57 into the component storage vessel 1. By contrast, operating pressure prevails in the pipeline 2 from the outlet end of the metering pump 4, in the throughflow duct 32, the completely closed annular groove 35a, the annular grooves 34a, 36a and 37a, the outlets 38a, the inlet 33b of the housing 12b, the completely closed annular grooves 34b and 36b, the annular grooves 35b, 39b and 40b, the second outlet 41b, the pipeline 9 and in the closure 42 which is open.

Annular collecting grooves 58a, 59a and 58b, 59b are arranged in the housings 12a and 12b. The annular collecting grooves 58a and 58b communicate through ducts 60a and 60b with the return bores 45a and 45b, whilst the collecting grooves 59a and 59b communicate through ducts 61a and 61b with the relief bores 49a and 49b.

In FIG. 2, the mixing heads M I, M II, MIII and M IV are equipped with operating switches 27, 28, 29 and 30. These operating switches are wired to a blocking device 31. The operating switch 30 of the mixing head M IV is shown as having been actuated, activating through the blocking device 31 a control system 25 provided with an on switch 62, so that the slides 13a and 13b are in the working position for the mixing head M IV. The control system 25 consists of pairs of contacts O, I, II, III and IV which on the one hand are wired to the blocking device 31 and, on the other hand, to the magnetic valves 17a, 17b, 18a, 18b. The associated contacts are designed to be connected by means of a selector switch 63.

The magnetic valves 17a, 17b, 18a and 18b are connected by branch lines 21a, 21b, 22a and 22b to a compressed air source 19 through a main line 20. The pressure amounts to 6 atms.. Adjusting cylinders 16a and 16b are connected through the yokes 15a and 15b to double-acting pistons 64a and 64b. Return springs 67 are arranged in the cylinder chambers 65a, 66a and 65b, 66b, the springs 67 being in the equilibrium position when the pistons 64a and 64b are in the zero position. Compressed air lines 23a and 24a lead from the magnetic valves 17a and 18a to the cylinder chambers 65a and 66a of the adjusting cylinders 16a. In the illustrated position of the magnetic valves 17a and 18a, the connecting ducts 68a and 69a are in the interrupting position. Accordingly, no medium is admitted to the cylinder chambers 65a and 66a.

Figure 3:
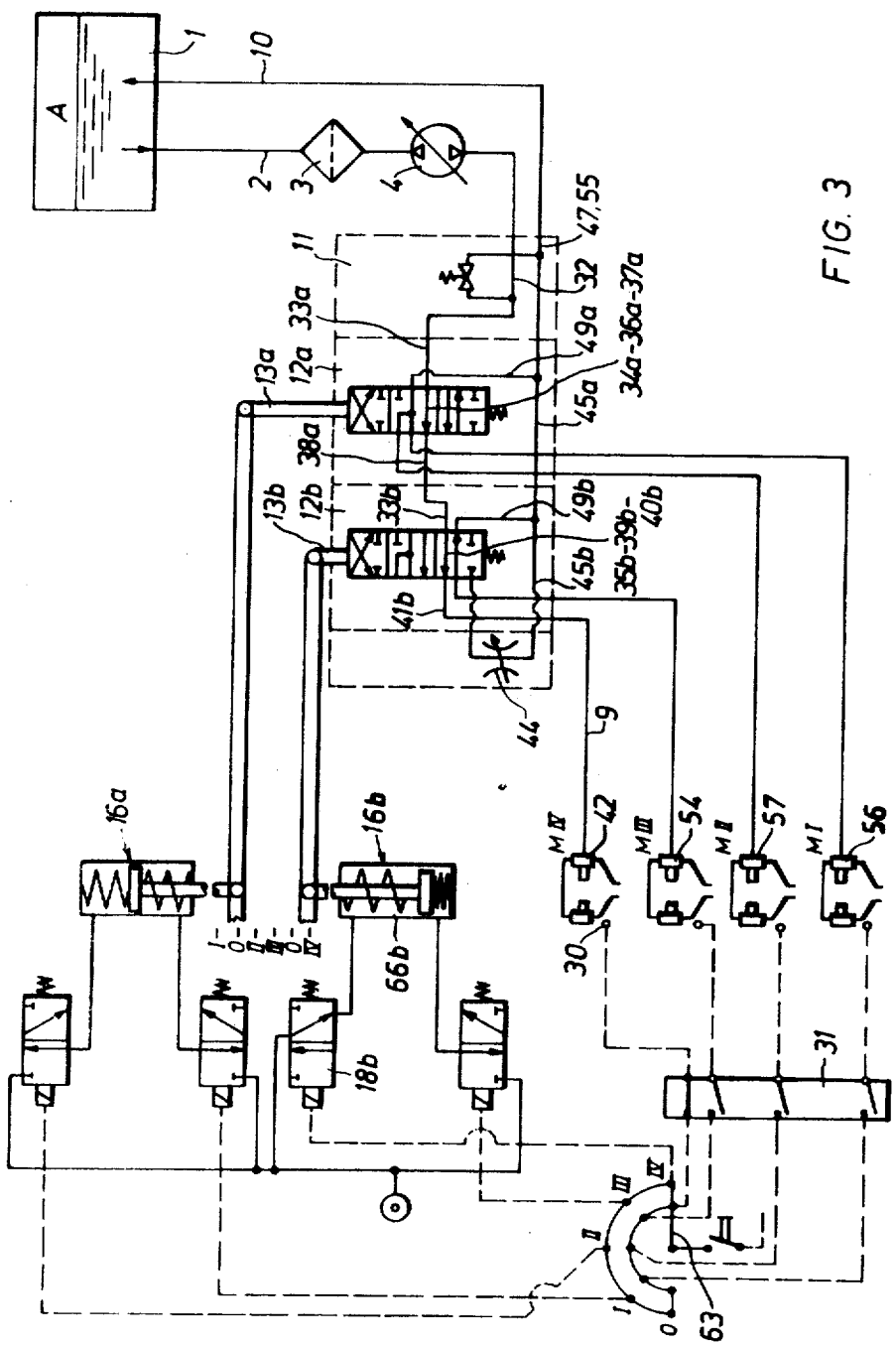
FIG. 3 is a circuit diagram of the machine in the working position shown in FIG. 2.

Compressed air lines 23b and 24b lead from the magnetic valves 17b and 18b to the cylinder chambers 65b and 66b of the adjusting cylinder 16b. The cylinder chamber 66b receives compressed air through the line 22b, the connecting duct 69b and the line 24b, whilst the cylinder chamber 65b is vented through the line 23b and the connecting duct 68b. The return spring 67 arranged in the cylinder chamber 65b is compressed. Since the working positions of the slides for operation of the other mixing heads (FIGS. 4, 5, 6) and for the circuit position (FIG. 7) are described in shortened form in the following, the machine with the slides 13a and 13b in the positions shown in FIG. 2 is shown again in FIG. 3 in simplified, circuit-diagram form and described briefly in the following:

From the component storage vessel 1, component A flows through the pipline 2 via the filter 3, under the delivery effect of the metering pump 4, through the throughflow duct 32 of the connecting plate 11 into the inlet 33a of the housing 12a, through 34a - 36a - 37a and the third outlet 38a of the housing 12a into the inlet 33b of the housing 12b, through 35b - 39b - 40b into the second outlet 41b, from there into the pipeline 9 and through the inlet 42 into the mixing head M IV. Beginning from the inlets 54, 56, 57 and the throttle valve 44, the entire remaining pipe system is relieved of pressure to the initial pressure prevailing in the vessel through the return bores 45b, 45a, 47, the relief bores 49b, 49a, 55 and the pipe 10. The slide 13a is in the zero position (throughflow position), whilst through actuation of the switch 30 the slide 13b is in the working position for the mixing head M IV by virtue of the fact that, through the blocking device 31, the magnetic valve 18b is adjusted by turning the selector switch 63 to the corresponding position in such a way that the cylinder chamber 66b of the adjusting cylinder 16b receives compressed air and the slide 13b assumes the working position M IV.

Figure 4:
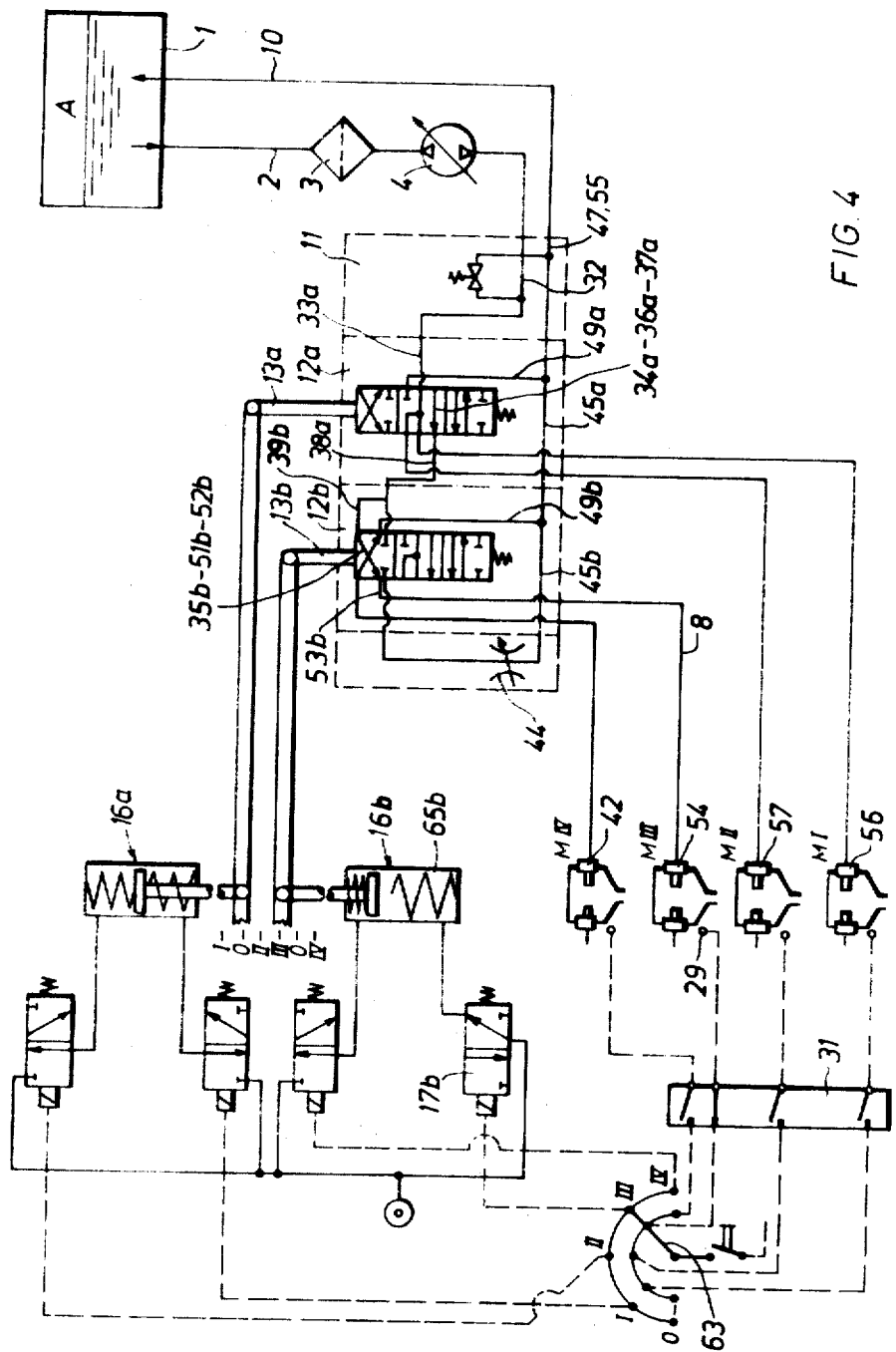
FIG. 4 is a circuit diagram of the machine in its working position for a third mixing head.

In FIG. 4, illustrating the operation of the mixing head M III, component A flows from the component storage vessel 1 through the pipeline 2 via the filter 3 under the delivery effect of the metering pump 4 through the throughflow duct 32 of the connecting plate 11 into the inlet 33a of the housing 12a, through 34a - 36a - 37a and the third outlet 38a of the housing 12a, into the inlet 39b of the housing 12b, through 35b - 51b - 52b into the first outlet 53b and from there into the pipeline 8 and via the inlet 54 into the mixing head M III. Beginning from the inlets 42, 56, 57 and the throttle valve 44, the entire remaining pipe system is relieved of pressure to the initial pressure prevailing in the storage vessel through return bores 45b, 45a, 47, the relief bores 49b, 49a, 55 and the pipe 10. The slide 13a is in the zero position (throughflow position), whilst, through actuation of the switch 29, the slide 13b is in the operating position for the mixing head M III by virtue of the fact that, through the blocking device 31, the magnetic valve 17b is adjusted by turning the selector switch 63 into the corresponding position in such a way that the cylinder chamber 65b of the adjusting cylinder 16b receives air under pressure and the slide 13b assumes the working position M III.

Figure 5:
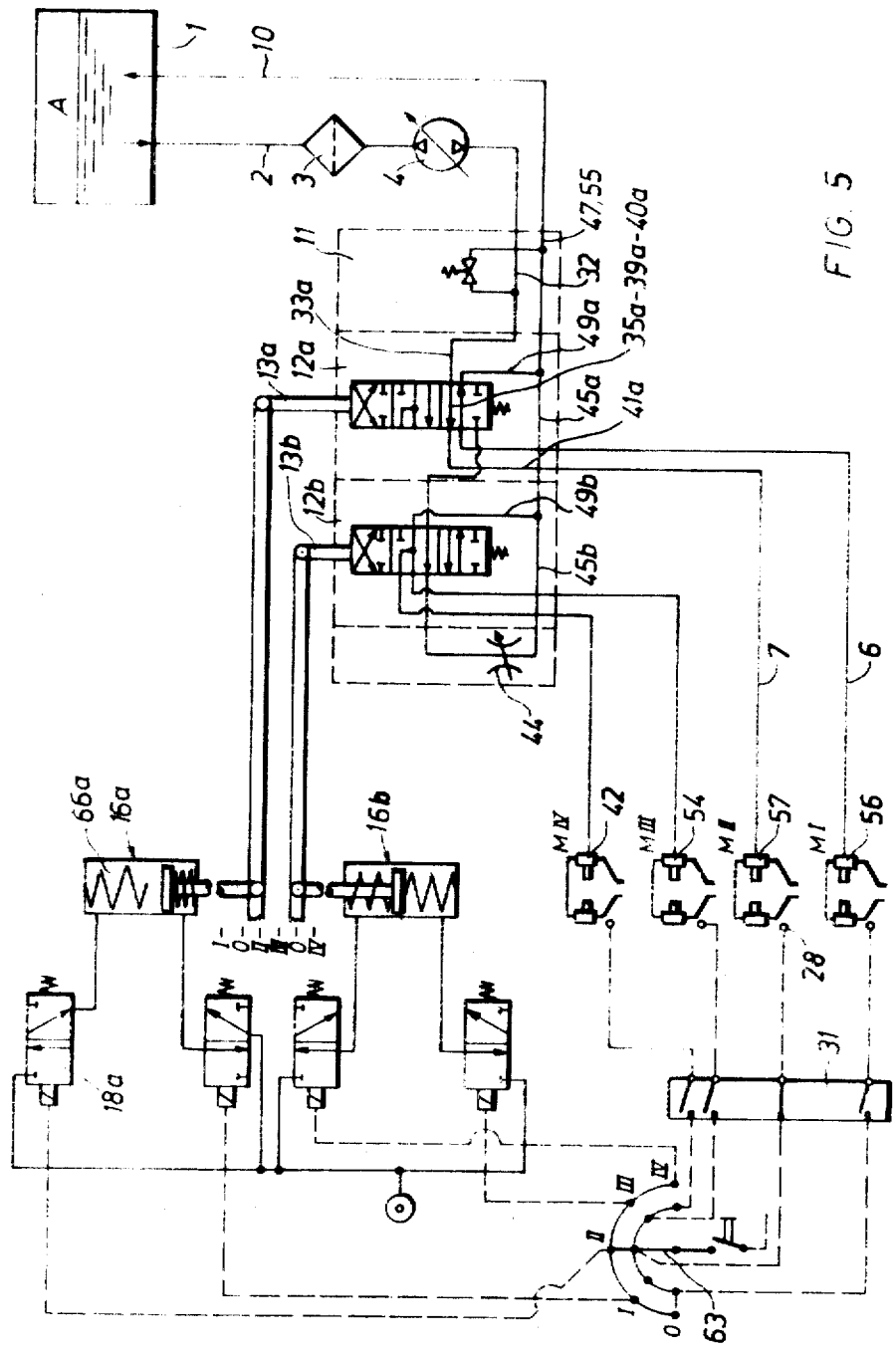
FIG. 5 is a circuit diagram of the machine in its working position for a second mixing head.

In FIG. 5, illustrating the operation of the mixing head M II, component A flows from the component storage vessel 1 through the pipeline 2 via the filter 3 under the delivery effect of the metering pump 4 through the throughflow duct 32 of the connecting plate 11 into the inlet 33a of the housing 12a, through 35a - 39a - 40a into the second outlet 41a and from there into the pipeline 7 and through the inlet 57 into the mixing head M II. Beginning from the inlets 42, 54 and 56 and the throttle valve 44, the entire remaining pipe system is relieved of pressure to the initial pressure prevailing in the storage vessel through the return bores 45b, 45a, 47, the relief bores 49b, 49a, 55 and the pipe 10. The slide 13a is in the working position for the mixing head M II by virtue of the fact that, by actuating the switch 28 through the blocking device 31, the magnetic valve 18a is adjusted by turning the selector switch 63 into the corresponding position in such a way that the cylinder chamber 66a of the adjusting cylinder 16a receives air under pressure and the slide 13a assumes the operating position M II. Although the slide 13b is in the zero position (throughflow position), it does not receive any inflow of component A because by virtue of its position the slide 13a prevents component A from continuing to flow into the housing 12b.

Figure 6:
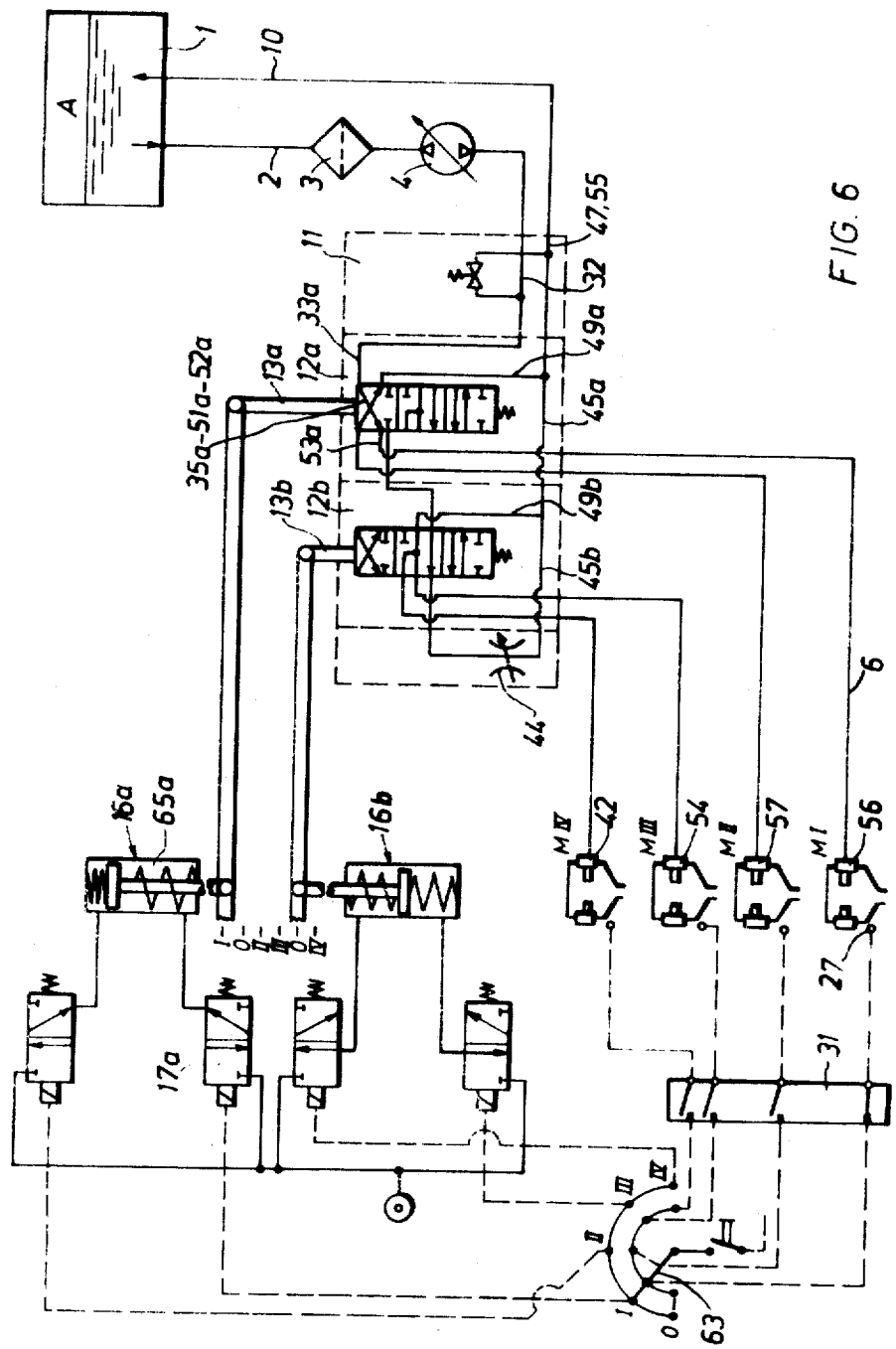
FIG. 6 is a circuit diagram through the machine in its working position for a first mixing head.

In FIG. 6, illustrating the operation of the mixing head M I, component A flows from the component storage vessel 1 through the pipeline 2 via the filter 3 under the delivery effect of the metering pump 4 through the throughflow duct 32 of the connecting plate 11 into the inlet 33a of the housing 12a, through 35a - 51a - 52a into the first outlet 53a, from there into the pipeline 6 and via the inlet 56 into the mixing head M I. Beginning from the inlets 42, 54 and 57 and the throttle valve 44, the entire remaining pipe system is relieved of pressure to the initial pressure prevailing in the storage vessel through the return bores 45b, 45a, 47, the relief bores 49b, 49a, 55 and the line 10. The slide 13a is in the working position for the mixing head M I by virtue of the fact that by actuating the switch 27 through the blocking device 31 the magnetic valve 17a is adjusted by turning the selector switch 63 into the corresponding position in such a way that the cylinder chamber 65a of the adjusting cylinder 16a receives air under pressure and the slide 13a assumes the operating position M I. The slide 13b is in the zero position (throughflow position), but does not receive any inflow of component A because by virtue of its position the slide 13a prevents component A from continuing to flow into the housing 12b.

Figure 7:
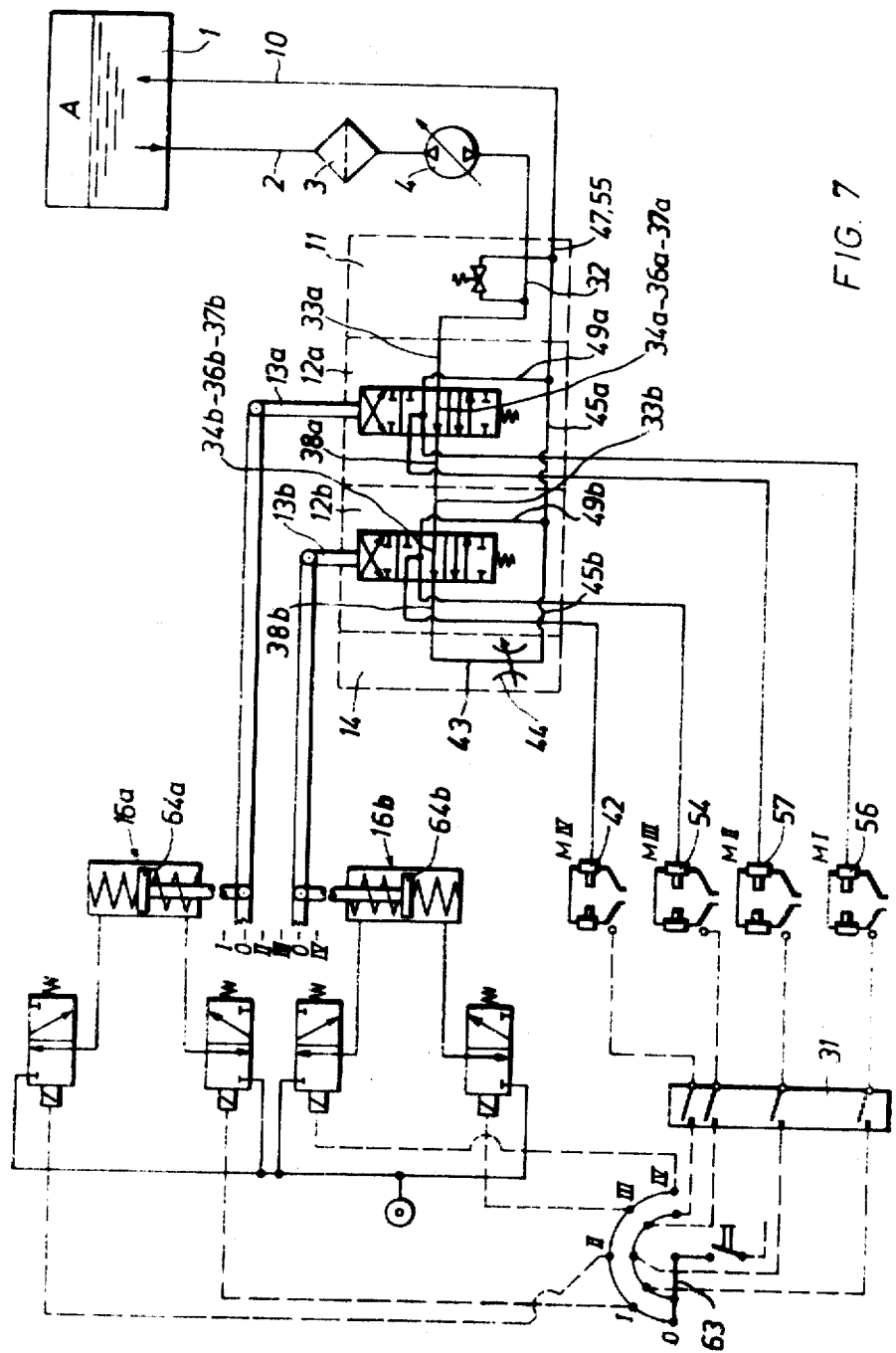
FIG. 7 is a circuit diagram of the machine in the circuit position.

FIG. 7, illustrates the case when none of the mixing heads M I, M II, M III and M IV is in the operating position and the component A is cycled. It flows from the component storage vessel 1 through the pipline 2 via the filter 3 under the delivery effect of the metering pump 4 through the throughflow duct 32 of the connecting plate 11 into the inlet 33a of the housing 12a, through 34a - 36a - 37a and the third outlet 38a of the housing 12a into the inlet 33b of the housing 12b, through 34b - 36b - 37b and the third outlet 38b into the return duct 43 of the end plate 14. Component A is under the working pressure up to the throttle valve 44 arranged in the return duct 43. Component A which is under the initial pressure of the storage vessel from the throttle valve 44 flows back into the component storage vessel 1 through return bores 45b, 45a and 47 and the pipe 10. The entire remaining pipe system, beginning from the inlets 42, 54, 56 and 57, is also relieved of pressure to the initial pressure prevailing in the storage vessel through the relief bores 49b, 49a and 55. In the circuit position, the selector switch 63 is in contact with the contact "0" so that no force is applied to the pistons 64a and 64b of the adjusting cylinders 16a and 16b. They are in the zero position (middle position) for the slides 13a and 13b.

Figure 8:
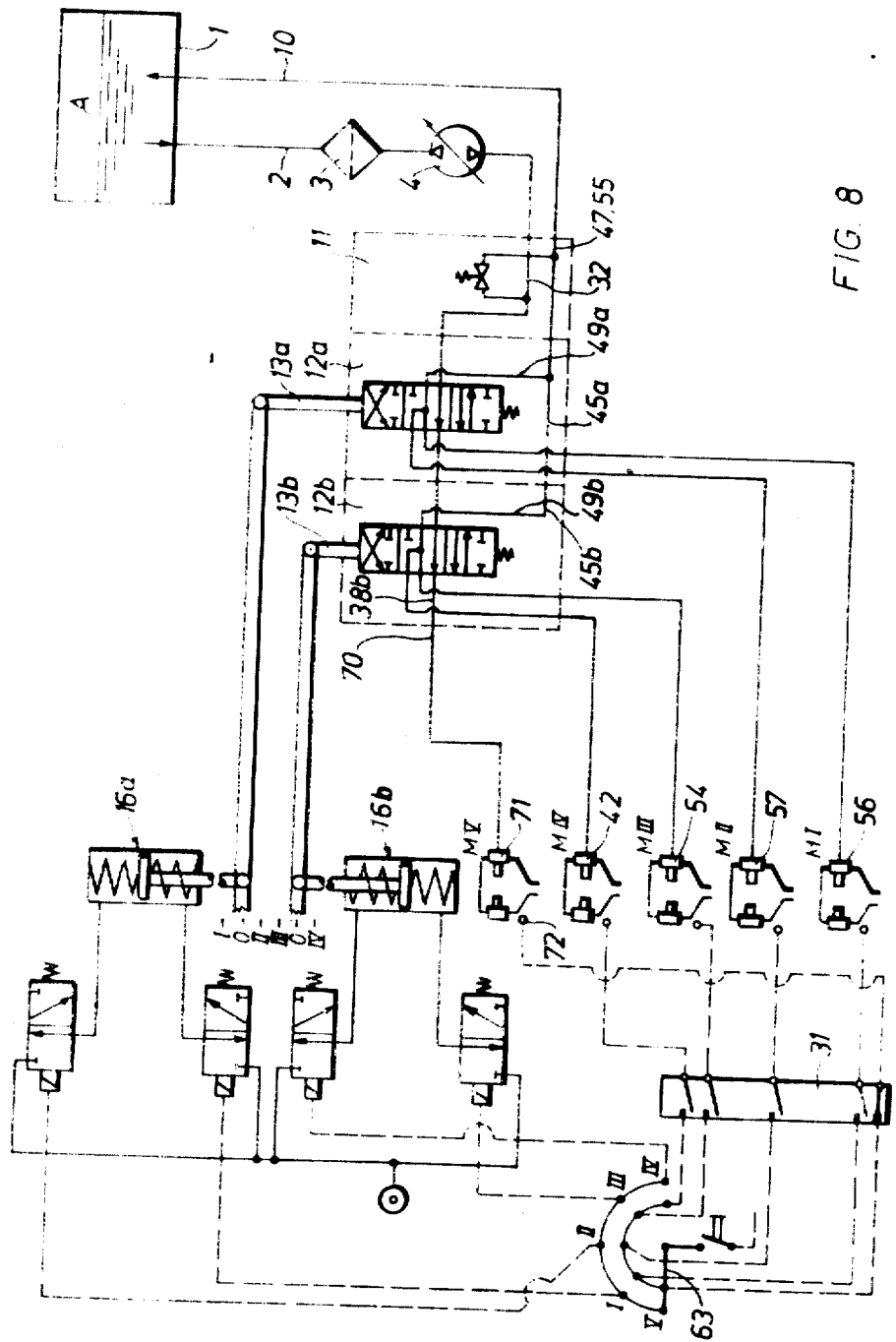
FIG. 8 is a circuit diagram of a modified machine with a fifth mixing head.

In FIG. 8, the modified machine illustrated does not have an end plate, but is provided instead with a pipeline 70 leading to the mixing head M V adjoining the third outlet 38b of the housing 12b. The slides 13a and 13b occupy the same position as for the circuit position shown in FIG. 7, and although the component also follows the path illustrated in FIG. 7 from the component storage vessel 1 to the third outlet 38b, it then flows through the pipeline 70 and the inlet 71 into the mixing head M V. Component A cannot be cycled in this embodiment of the machine. The entire remaining pipe system, beginning from the inlets 42, 54, 56 and 57, is relieved of pressure through return ducts 45b, 45a, 47, the relief bores 49b, 49a, 55 and the pipe 10. The slides 13a and 13b are in the zero position which corresponds to the working position V for the mixing head M V. By actuating the switch 72 on the mixing head M V, this position is reached through the blocking device 31 by positioning the selector switch 63 on the contacts "V".

What we claim is:

1. A machine for filling moulds or cavities with a free flowing mixture of at least two components maintained separately in storage vessels therefor, the machine comprising:
   a. a pair of mixing heads comprising a first and a second mixing head,
   b. a pipeline switch for connection to each of the storage vessels and for successively delivering its component to the respective mixing heads,
   c. each pipeline switch comprising an inlet for connection to its storage vessel, and a housing member including a cooperating slide, the housing member of each pipeline switch comprising an inlet communicating with the pipeline switch inlet, a first outlet having a pipeline connected to the first mixing head, a second outlet having a pipeline connected to the second mixing head, and a third outlet for receiving the component of the pipeline switch, the slide and housing of each pipeline switch having coordinated constructions so that by selected movement the slide in the housing, the inlet can be exclusively communicated with any one of said outlets,
   d. and actuating means coupled with the pipeline switches for operation of the slides thereof for successively delivering the components simultaneously to each mixing head.

2. A machine according to claim 1, wherein the housings comprise relief bores which communicate through relief ducts in the slides with the pipelines which lead to the non-functioning mixing heads and which are shut off on the one hand by the slides and on the other hand by inlets of the mixing heads, the relief duct associated with the functioning mixing head being completely closed in the housing.

3. A machine according to claim 1, wherein each housing comprises a return bore, the third outlet of each housing being connected through a return line with the inlet of the return bore, and a return line leading to the component storage vessel being connected to the outlet of the return bore.

4. A machine according to claim 3, wherein for each pipeline switch, a throttle valve is arranged in the return line between the third outlet and the inlet of the return bore.

5. A machine according to claim 2, wherein the return bores also form the relief bores whilst the return ducts also form the relief ducts.

6. A machine as claimed in claim 5 wherein the inlet of each housing opens into annular grooves surrounding the slides whilst the outlets of the housing open from annular grooves surrounding the slides.

7. A machine according to claim 2, wherein the relief ducts comprise annular grooves arranged in the slides.

8. A machine according to claim 2, wherein annular collecting grooves for leakage liquid are provided surrounding the slides and having a connection with the relief bores, the collecting grooves being arranged towards the ends of the housing.

9. A machine according to claim 1, wherein the housing of each pipeline switch is preceded via a seal by a connecting plate into which a pipeline leading away from the component storage vessel can open into a throughflow duct which corresponds to the inlet of the housing.

10. A machine according to claim 9, wherein a return duct is provided in the connecting plate, which at one end corresponds to the return bore of the housing and from the other end of which the return line leads to a connection for the component storage vessel.

11. A machine according to claim 10, wherein a safety valve is arranged in the connecting plate between the throughflow duct and the return duct.

12. A machine according to claim 1 wherein the third outlet of each housing is provided with a closure comprising an end plate.

13. A machine according to claim 12, wherein each pipeline switch comprises a return bore, and the end plate has a return duct for connecting the third outlet to the inlet of the return bore of the housing.

14. A machine according to claim 1, and a control system for the actuating means for initiation and operation of the actuating means.

15. A machine according to claim 14, wherein the control system is equipped with actuating switches for each mixing head, and a blocking device which prevents more than one mixing head from being simultaneously actuated.

16. A machine according to claim 14, wherein the control system is activated and monitored by a program transmitter.

17. A machine according to claim 1, the third outlet of the housing of each of the pipeline switches being connected to receiving means, said receiving means being a further mixing head.

18. A machine according to claim 1, the housing of each pipeline switch being identical.

19. A machine according to claim 1, including an additional pair of mixing heads, each pipeline switch having a second housing member and cooperating slide of the same construction as the other thereof, the inlet of the second housing being connected to the third outlet of the other housing, and the first outlet and the second outlet of the second housing having pipelines connected, respectively, to the mixing heads of said additional pair for successively delivering the components simultaneously to each of the mixing heads of the additional pair of mixing heads.

20. A machine according to claim 19, wherein the housings comprise relief bores which communicate through relief ducts in the slides with the pipelines which lead to the non-functioning mixing heads and which are shut off on the one hand by the slides and on the other hand by inlets of the mixing heads, the relief duct associated with the functioning mixing head being completely closed in the housing.

21. A machine according to claim 19, wherein the housings comprise return bores, the third outlet of the last housing of each pipeline switch being connected through a return line with the inlet of a return bore, and a return line leading to the component storage vessel being connected to the outlet of the return bores of the first housing, whilst in any remaining housings the outlet of the return bore of the preceding housing communicates withe the inlet of the return bore of the following housing, as seen in the return direction.

22. A machine according to claim 21, wherein a throttle valve is arranged in the return line between the third outlet of the last housing and its inlet of the return bore.

23. A machine according to claim 20, wherein the return bores also form the relief bores whilst the return ducts also form the relief ducts.

24. A machine as claimed in claim 23, wherein the inlet of each housing opens into annular grooves surrounding the slides whilst the outlets of the housing open from annular groves surrounding the slides.

25. A machine according to claim 20, wherein the relief ducts comprise annular grooves arranged in the slides.

26. A machine according to claim 20, wherein annular collecting grooves for leakage liquid are provided surrounding the slides and having a connection with the relief bores, the collecting grooves being arranged towards the ends of the housing.

27. A machine according to claim 19, wherein the first housing of each pipeline switch is preceded via a seal by a connecting plate into which a pipeline leading away from the component storage vessel can open into a throughflow duct which corresponds to the inlet of the first housing.

28. A machine according to claim 27, wherein a return duct is provided in the connecting plate, which at one end corresponds to the return bore of the first housing and from the other end of which the return line leads to the connection for the component storage vessel.

29. A machine according to claim 28, wherein a safety valve is arranged in the connecting plate between the throughflow duct and the return duct.

30. A machine according to claim 19, wherein the third outlet of the last housing of each pipeline switch is provided with a closure comprising an end plate.

31. A machine according to claim 30, wherein each pipeline switch comprises a return bore, and the end plate has a return duct for connecting the third outlet to the inlet of the return bore of the last housing.

32. A machine according to claim 19, and a control system for the actuating means for initiation and operation of the actuating means.

33. A machine according to claim 32, wherein the control system is equipped with actuating switches for each mixing head, and a blocking device which prevents more than one mixing head from being simultaneously actuated.

34. A machine according to claim 19, the third outlet of the last housing of each of the pipeline switches being connected to receiving means, said receiving means being a further mixing head.

35. A machine according to claim 19, the housing of each pipe switch being identical.

36. A machine according to claim 32, wherein the control system is activated and monitored by a program transmitter.

* * * * *